United States Patent Office.

WILLIAM W. WELLS, OF FREEHOLD, NEW JERSEY.

Letters Patent No. 88,826, dated April 13, 1869.

IMPROVED LINIMENT.

The Schedule referred to in these Letters Patent and making part of the same.

*To whom it may concern:*

Be it known that I, WILLIAM W. WELLS, of Freehold, in the county of Monmouth, and State of New Jersey, have invented, manufactured, discovered, and compounded a Liniment, different from any now in use, or heretofore compounded by any other person; and I do hereby declare that the following is a full and exact description thereof, and the ingredients of which the same is compounded.

The nature of my discovery, or invention, and the ingredients of which the same is compounded, are as follows:

One gallon of spirits of turpentine, two ounces of origanum, three ounces of oil of sassafras, three ounces of oil of amber, and one half ounce of camphor, all mixed together, and thoroughly shaken.

I claim the improved liniment herein described.

WM. W. WELLS.

Witnesses:
JOHN J. ELY,
G. W. SHINN.